United States Patent [19]
Usui et al.

[11] Patent Number: 5,849,855
[45] Date of Patent: Dec. 15, 1998

[54] BLOCKED POLYISOCYANATE COMPOSITION AND ONE-PACK THERMOCURING RESIN COMPOSITION COMPRISING THE SAME

[75] Inventors: Taketoshi Usui; Yoshiyuki Asahina, both of Nobeoka, Japan

[73] Assignee: Asahi Kasei Kogyo Kabushiki Kaisha, Osaka, Japan

[21] Appl. No.: 699,297

[22] Filed: Aug. 19, 1996

[30] Foreign Application Priority Data

Apr. 12, 1996 [JP] Japan ................................. 8-091182

[51] Int. Cl.$^6$ .......................... C08G 18/80; C08G 18/42; C08G 18/40; C07C 265/02

[52] U.S. Cl. ................ 528/45; 252/182.21; 252/182.22; 528/48; 528/49; 528/70; 528/73; 528/75; 528/76; 528/80; 528/83; 544/193; 544/222; 560/115; 560/125; 560/155; 560/157; 560/158; 560/169; 560/331; 560/355; 564/123; 564/134; 564/135; 564/136

[58] Field of Search .................... 252/182.21, 182.22; 528/45, 48, 49, 73, 76, 80, 83, 70, 75; 544/193, 222; 560/115, 125, 157, 155, 158, 169, 331, 355; 564/123, 134, 135, 136

[56] References Cited

U.S. PATENT DOCUMENTS

| | | | |
|---|---|---|---|
| 4,007,215 | 2/1977 | Hartmann et al. | 560/125 |
| 4,087,392 | 5/1978 | Hartmann et al. | 525/454 |
| 4,101,530 | 7/1978 | Burkhardt et al. | 528/45 |
| 4,132,843 | 1/1979 | Dalibor | 528/45 |
| 4,302,351 | 11/1981 | Gras et al. | 528/45 |
| 4,332,965 | 6/1982 | Dalibor | 528/45 |
| 4,345,057 | 8/1982 | Yamabe et al. | 526/247 |
| 4,439,593 | 3/1984 | Kelso et al. | 528/45 |
| 4,518,522 | 5/1985 | Markusch et al. | 528/45 |
| 4,582,888 | 4/1986 | Kase et al. | 528/49 |
| 4,606,947 | 8/1986 | Heinrich et al. | 528/45 |
| 4,640,966 | 2/1987 | Mitani et al. | 526/249 |
| 4,677,180 | 6/1987 | Schmitt et al. | 528/45 |
| 4,690,968 | 9/1987 | Mitani et al. | 524/315 |
| 5,071,937 | 12/1991 | Potter et al. | 528/45 |
| 5,126,424 | 6/1992 | Brindöpke et al. | 528/45 |
| 5,154,950 | 10/1992 | Rosthauser et al. | 427/340 |
| 5,239,028 | 8/1993 | Nakagawa et al. | 526/265 |
| 5,466,860 | 11/1995 | Flosbach et al. | 560/43 |
| 5,621,063 | 4/1997 | Wolf et al. | 528/45 |
| 5,705,593 | 1/1998 | Schmalstieg et al. | 528/45 |

FOREIGN PATENT DOCUMENTS

| | | |
|---|---|---|
| 0 646 608 A1 | 4/1995 | European Pat. Off. . |
| 57-47321 | 3/1982 | Japan . |
| 60-149572 | 8/1985 | Japan . |
| 3-17116 | 1/1991 | Japan . |
| 3-6273 | 1/1991 | Japan . |
| 1 442 024 | 7/1976 | United Kingdom . |

*Primary Examiner*—Rabon Sergent
*Attorney, Agent, or Firm*—Pennie & Edmonds LLP

[57] ABSTRACT

Disclosed is a blocked polyisocyanate composition comprising: a blocked polyisocyanate obtained by blocking the terminal isocyanate groups of a two or more terminal isocyanate groups-containing polyisocyanate derived from at least one diisocyanate selected from an aliphatic diisocyanate and an alicyclic diisocyanate with a blocking agent comprising at least one active methylene compound selected from a malonic diester and an acetoacetic ester; and a salt of a basic compound with an acidic compound, or a mixture of the salt with the basic compound or the acidic compound, the composition having a pH value of from 1 to 8.5. The blocked polyisocyanate composition of the present invention not only exhibits high stability even under high temperature conditions, but also is capable of maintaining such high stability for a prolonged period of time. The blocked polyisocyanate composition can be combined with a polyol to provide a one-pack thermocuring resin composition which exhibits not only excellent storage stability but also excellent curability even under low temperature conditions, which therefore can be advantageously used as various coating materials, adhesives, sealing agents and the like.

7 Claims, No Drawings

BLOCKED POLYISOCYANATE COMPOSITION AND ONE-PACK THERMOCURING RESIN COMPOSITION COMPRISING THE SAME

BACKGROUND OF THE INVENTION

1. Field of the Invention

The present invention relates to a novel blocked polyisocyanate composition, and a one-pack thermocuring resin composition comprising the same. More particularly, the present invention is concerned with a novel blocked polyisocyanate composition comprising a blocked polyisocyanate obtained by blocking the terminal isocyanate groups of a two or more terminal isocyanate groups-containing polyisocyanate derived from an aliphatic and/or alicyclic diisocyanate with a blocking agent comprising at least one active methylene compound, and a salt of a basic compound with an acidic compound, or a mixture of the salt with the basic compound or the acidic compound, wherein the blocked polyisocyanate composition has a pH value of from 1 to 8.5. The present invention is also concerned with a method for producing the above-mentioned blocked polyisocyanate composition. Further, the present invention is also concerned with a one-pack thermocuring resin composition comprising the blocked polyisocyanate composition and a polyol. The blocked polyisocyanate composition of the present invention not only exhibits high stability even under high temperature conditions, but also is capable of maintaining such high stability for a prolonged period of time. Further, the one-pack thermocuring resin composition of the present invention, comprising the above-mentioned blocked polyisocyanate composition and a polyol, exhibits not only excellent storage stability but also excellent curability even under low temperature conditions. Therefore, the resin composition of the present invention can be advantageously used as a topcoating and an intercoating material for an automobile; a chip-resistant coating material; an electrodeposition coating material; a coating material for an automobile part; a coating material for repairing an automobile; a coating material for a precoated metal or a rust-resistant steel plate of a metallic product, such as a domestic electric appliance or a business and office machine; a coating material for a building material; a coating material for a plastic; an adhesive; an adhesiveness-imparting agent; a sealing agent; and the like.

2. Prior Art

A coating formed from a polyurethane coating material has excellent properties, such as excellent abrasion resistance, chemical resistance and stain resistance. Specifically, a coating formed from a polyurethane coating material containing, as a curing agent, a polyisocyanate derived from an aliphatic and/or an alicyclic diisocyanate has excellent weather-ability in addition to the above-mentioned excellent properties. Therefore, a demand for such a polyurethane coating material containing a polyisocyanate as a curing agent has been increasing.

However, conventional polyurethane coating materials are generally in the form of a two-pack coating composition, which is disadvantageous in respect of ease in coating operation. The reason for this is as follows. Generally, a conventional two-pack polyurethane coating material comprises a polyol as a main agent and a polyisocyanate as a curing agent, in which the main agent and the curing agent are separately stored, and mixed in use. Upon mixing these two components, the resultant mixture starts to cure to form a gel in a short period of time, which gel no longer can be used for coating operation. Due to this disadvantage, it is very difficult to use such a two-pack polyurethane coating material in an automated coating system in the field of an automobile or a domestic electric appliance, in which a coating operation is conducted in an assembly-line operation. Further, when such a polyurethane coating material is used, it becomes necessary to clean apparatuses used for the coating operation, such as a coating machine and a container for the coating material, after the coating operation, so that the efficiency of the coating operation on the whole becomes markedly low. In addition, an isocyanate has high reactivity with water. Therefore, it has conventionally been impossible to use an isocyanate in an aqueous coating material, such as an electrodeposition coating material.

For solving the above-mentioned problems, various proposals have been made. For example, it has been proposed to use a blocked polyisocyanate, in which substantially all of the active isocyanate groups are blocked with a blocking agent. When such a blocked polyisocyanate is used in a coating composition comprising a polyol as a main agent, the blocked polyisocyanate does not react with a polyol at room temperature, but upon heating the composition, the blocking group is released from the isocyanate group, thereby causing a crosslinking reaction between the active isocyanate group (deblocked), which is no longer blocked with the blocking agent, and the polyol. Accordingly, intensive studies have been made with respect to such a blocking agent. Representative examples of conventional blocking agents include phenol and methyl ethyl ketoxime.

However, in the case of a coating composition containing a conventional blocked polyisocyanate obtained by using such a conventional blocking agent, for forming an ultimate coating, it is necessary to conduct baking of a coating formed from the composition at a temperature as high as 140° C. or more. Such a high baking temperature is disadvantageous not only in that a large amount of energy is required for conducting the baking at such a high temperature, but also in that substrates to be coated are inevitably limited to those which have high heat resistance.

Unexamined Japanese Patent Application Laid-Open Specification No. 3-17116 discloses a one-pack coating composition comprising a blocked polyisocyanate, in which a pyridine compound is used as a blocking agent. This coating composition is capable of forming an ultimate coating by baking at a relatively low temperature. However, the coating composition has disadvantageously poor storage stability.

Further, various studies have been made with respect to a blocked polyisocyanate obtained by the use of an active methylene compound (such as a malonic diester and an acetoacetic ester) as a blocking agent, which can be used for obtaining a coating composition capable of forming an ultimate coating by baking at a relatively low temperature. Examples of patent documents disclosing such a blocked polyisocyanate include Unexamined Japanese Patent Application Laid-Open Specification No. 52-059139 (corresponding to U.S. Pat. No. 4,101,530, BE Publication 848,036, SE Publication 7,612,309, FR Publication 2,330, 731, GB Publication 1,498,615, DE Publication 2,550,156 and IT Publication 1,066,672), Unexamined Japanese Patent Application Laid-Open Specification No. 52-116417 (corresponding to U.S. Pat. No. 4,132,843, DE Publication 2612784, BE Publication 851,794, NL Publication 7,701, 247, SE Publication 7,700,744, FR Publication 2345428 and GB Publication 1,575,020), Unexamined Japanese Patent Application Laid-Open Specification No. 60-149572, U.S. Pat. No. 4,007,215 and DE Publication 2,342,603. The thermocuring coating compositions containing, as a curing agent, the active methylene-blocked polyisocyanates disclosed in these documents exhibit excellent curability even at a relatively low temperature. However, the coating compositions containing such blocked polyisocyanates have poor storage stability, so that it is necessary to store such coating composition under low temperature conditions.

U.S. Pat. Nos. 4,439,593, 4,518,522 and 4,677,180 disclose a technique to improve the storage stability of a one-pack coating composition containing the active methylene-blocked polyisocyanate by addition of a monofunctional compound to the blocked polyisocyanate or the coating composition containing the blocked polyisocyanate. However, in the technique of these patent documents, when the monofunctional compound is added to the blocked polyisocyanate disclosed and used in these patent documents prior to the preparation of the one-pack coating composition, the stability of the blocked polyisocyanate is disadvantageously lowered. Therefore, especially when the mixture of the blocked polyisocyanate used in the above patent documents and the monofunctional compound is stored for a prolonged period of time or stored under high temperature conditions and then used for producing a one-pack coating composition, the obtained coating composition is caused to have disadvantageously poor curability. Therefore, when a mixture of the blocked polyisocyanate disclosed in the above patent documents and the monofunctional compound is intended to be used for producing a coating composition, the mixture must be used immediately after the preparation of the mixture, or must be stored under low temperature conditions.

Unexamined Japanese Patent Application Laid-Open Specification No. 7-258381 (corresponding to U.S. Pat. No. 5,466,860, EP Publication 0 653 468, CA Publication 2135412, DE Publication 4338703 and DE Publication 4405042) discloses a technique to obtain a blocked polyisocyanate composition free from the occurrence of yellowing, in which a polyisocyanate is reacted with an active methylene compound in the presence of a basic compound, such as lithium hydroxide, which is insoluble in the reaction medium, and the basic compound is removed from the reaction mixture by filtration after the reaction. In this instance, although the removal of the basic compound is attempted, the obtained blocked polyisocyanate composition necessarily, disadvantageously has a high pH value. As a result, such a composition has poor stability (see Comparative Examples 3 and 6 of the present specification).

SUMMARY OF THE INVENTION

The present inventors have made extensive and intensive studies toward solving the above-mentioned problems accompanying the conventional blocked polyisocyanate, and developing a blocked polyisocyanate composition, which not only exhibits high stability even under high temperature conditions, but also is capable of maintaining such high stability for a prolonged period of time. As a result, it has unexpectedly been found that a blocked polyisocyanate composition, which comprises a blocked polyisocyanate obtained by blocking the terminal isocyanate groups of a two or more terminal isocyanate groups-containing polyisocyanate derived from an aliphatic and/or alicyclic diisocyanate with a blocking agent comprising at least one active methylene compound, and a salt of a basic compound with an acidic compound, or a mixture of the salt with the basic compound or the acidic compound, and which has a pH value of from 1 to 8.5, exhibits high stability even under high temperature conditions, and is capable of maintaining such high stability for a prolonged period of time. Further, the present inventors have found that a one-pack thermocuring resin composition comprising the above-mentioned blocked polyisocyanate and a polyol exhibits not only excellent storage stability, but also excellent curability even under low temperature conditions. The present invention has been made, based on these novel findings.

Accordingly, it is a primary object of the present invention to provide a blocked polyisocyanate composition, which not only exhibits high stability even under high temperature conditions, but also is capable of maintaining such high stability for a prolonged period of time.

It is another object of the present invention to provide a method for producing the above-mentioned blocked polyisocyanate composition.

It is a further object of the present invention to provide a one-pack thermocuring resin composition comprising the above-mentioned blocked polyisocyanate and a polyol, which exhibits not only excellent storage stability but also excellent curing ability even under low temperature conditions.

The foregoing object and other objects, features and advantages of the present invention will be apparent from the following detailed description and appended claims.

DETAILED DESCRIPTION OF THE INVENTION

Essentially, according to the present invention, there is provided a blocked polyisocyanate composition comprising:
  a blocked polyisocyanate obtained by blocking the terminal isocyanate groups of a two or more terminal isocyanate groups-containing polyisocyanate derived from at least one diisocyanate selected from an aliphatic diisocyanate and an alicyclic diisocyanate with a blocking agent comprising at least one active methylene compound selected from a malonic diester and an acetoacetic ester; and
  a salt of a basic compound with an acidic compound, or a mixture of the salt with the basic compound or the acidic compound,
  the composition having a pH value of from 1 to 8.5.

For an easy understanding of the present invention, the essential features and various preferred embodiments of the present invention are enumerated below.

1. A blocked polyisocyanate composition comprising:
  a blocked polyisocyanate obtained by blocking the terminal isocyanate groups of a two or more terminal isocyanate groups-containing polyisocyanate derived from at least one diisocyanate selected from an aliphatic diisocyanate and an alicyclic diisocyanate with a blocking agent comprising at least one active methylene compound selected from a malonic diester and an acetoacetic ester; and
  a salt of a basic compound with an acidic compound, or a mixture of the salt with the basic compound or the acidic compound,
  the composition having a pH value of from 1 to 8.5.

2. The composition according to item 1 above, wherein the two or more terminal isocyanate groups-containing polyisocyanate is a urethane-modified isocyanurate polyisocyanate.

3. The composition according to item 1 or 2 above, wherein the two or more terminal isocyanate groups-containing polyisocyanate has an average number of functional isocyanate groups of from 4.5 to 10 per molecule of the polyisocyanate.

4. The composition according to any one of items 1 to 3 above, wherein the blocking agent comprises a mixture of 30 to 90 equivalent % of a malonic diester and 70 to 10 equivalent % of an acetoacetic ester.

5. The composition according to any one of items 1 to 4 above, further comprising at least one compound selected from monofunctional and bifunctional compounds each containing active hydrogen.

6. A method for producing a blocked polyisocyanate composition, comprising reacting a two or more terminal isocyanate groups-containing polyisocyanate derived from at least one diisocyanate selected from an aliphatic diisocyanate and an alicyclic diisocyanate with a blocking agent comprising at least one active methylene compound selected from a malonic diester and an acetoacetic ester in the presence of a basic compound to obtain a reaction mixture containing the basic compound, and reacting the reaction mixture with an acidic compound in an amount sufficient to neutralize at least a part of the basic compound and cause the resultant blocked polyisocyanate composition to have a pH value of from 1 to 8.5.

7. A one-pack thermocuring resin composition comprising a blocked polyisocyanate composition according to any one of items 1 to 5 above and a polyol.

The present invention is described below in detail.

The blocked polyisocyanate used in the blocked polyisocyanate composition of the present invention can be prepared by a conventional method, specifically by reacting a two or more terminal isocyanate groups-containing polyisocyanate derived from at least one diisocyanate selected from an aliphatic diisocyanate and an alicyclic diisocyanate with a blocking agent comprising at least one active methylene compound selected from a malonic diester and an acetoacetic ester. As an aliphatic diisocyanate, a $C_4$–$C_{30}$ diisocyanate is preferred, and as an alicyclic diisocyanate, a $C_8$–$C_{30}$ diisocyanate is preferred. Examples of such diisocyanates include tetramethylene diisocyanate, pentamethylene diisocyanate, hexamethylene diisocyanate (hereinafter, referred to simply as "HDI" ), 2,2,4 (or 2,4,4)-trimethyl-1, 6-diisocyanatohexane, lysine diisocyanate, isophorone diisocyanate (hereinafter, referred to simply as "IPDI"), 1,3-bis(isocyanatomethyl)-cyclohexane and 4,'-dicyclohexylmethane diisocyanate. These diisocyanates can be used individually or in combination. Of the above-mentioned diisocyanates, HDI and IPDI are preferred, and HDI is most preferred, because these compounds are easily available and can be advantageously used for producing a thermocuring resin composition capable of forming a coating having excellent weatherability.

In the present invention, it is preferred that the two or more terminal isocyanate groups-containing polyisocyanate have an average number of functional isocyanate groups of from 2 to 15, more preferably from 3 to 12, most preferably from 4.5 to 10 per molecule of the polyisocyanate. When a polyisocyanate having an average number of functional polyisocyanate groups of less than 2 per molecule thereof is used to prepare a blocked polyisocyanate composition, the obtained composition exhibits poor crosslinking ability with a polyol. Therefore, when such a composition is used in a thermocuring resin composition, for obtaining an ultimate coating having a satisfactory solvent resistance and weatherability, it is necessary to heat a coating formed from the thermocuring resin composition at a high temperature or for a prolonged period of time. On the other hand, when a polyisocyanate having an average number of functional isocyanate groups of more than 15 per molecule thereof is used to prepare a blocked polyisocyanate composition, a thermocuring resin composition containing such a blocked polyisocyanate composition is disadvantageous in that a large amount of leveling agent must be added to such a thermocuring resin composition, so as to obtain a coating having a satisfactorily smooth surface finish.

The average number of functional isocyanate groups per molecule of a polyisocyanate means the average number of isocyanate groups which are bonded to one molecule of the polyisocyanate, and can be calculated by the following formula:

$$\frac{\text{The average} \atop \text{molecular weight of} \atop \text{polyisocyanate} \times \text{The concentration of} \atop \text{isocyanate group in} \atop \text{polyisocyanate}}{42(\text{molecular weight of an isocyanate group})},$$

wherein the concentration of isocyanate group is defined as a weight ratio of isocyanate (NCO) group to polyisocyanate.

Examples of two or more terminal isocyanate groups-containing polyisocyanates derived from at least one diisocyanate selected from an aliphatic diisocyanates and an alicylic diisocyanate include polyisocyanates having, in respective molecules thereof, a isocyanurate structure, a biuret structure, a urethane structure, an allophanate structure and a urethodione structure, respectively.

With respect to a method for producing, from the diisocyanate, the above-mentioned polyisocyanate having, in a molecule thereof, a biuret structure, reference can be made to, for example, Examined Japanese Patent Application Publication No. 42-001994 (corresponding to U.S. Pat. No. 3,358,010), Examined Japanese Patent Application Publication No. 45-021802 (corresponding to U.S. Pat. No. 3,644,490) and U.S. Pat. No. 3,124,605.

With respect to a method for producing, from the diisocyanate, the above-mentioned polyisocyanate having, in a molecule thereof, an isocyanurate structure, reference can be made to, for example, Examined Japanese Patent Application Publication No. 45-027982 (corresponding to U.S. Pat. No. 3,487,080), Unexamined Japanese Patent Application Laid-Open Specification No. 50-047988 (corresponding to U.S. Pat. No. 3,919,218), Unexamined Japanese Patent Application Laid-Open Specification No. 52-017484 (corresponding to U.S. Pat. No. 4,040,992), and Examined Japanese Patent Application Publication No. 07-116163.

With respect to a method for producing, from the diisocyanate, the above-mentioned polyisocyanate having, in am molecule thereof, a urethane structure, reference can be made to, for example, U.S. Pat. No. 3,183,112.

With respect to a method for producing, from the diisocyanate, the above-mentioned polyisocyanate having, in a molecule thereof, an allophanate structure, reference can be made to, for example, Unexamined Japanese Patent Application Laid-Open Specification No. 46-001671 (corresponding to U.S. Pat. No. 3,769,318) and GB publication 994,890.

With respect to a method for producing, from the diisocyanate, the above-mentioned polyisocyanates having, in molecules thereof, a urethodione structure, reference can be made to, for example, Examined Japanese Patent Application Publication No. 45-012287 (corresponding to DE publication 1670720 and GB publication 1,153,815) and Unexamined Japanese Patent Application Laid-Open Specification No. 59-33265 (corresponding to U.S. Pat. No. 4,668,780).

Of the above-mentioned polyisocyanates, the polyisocyanate having, in a molecule thereof, an isocyanurate structure (hereinafter, frequently referred to simply as a "isocyanurate polyisocyanate") is preferred, because the isocyanurate polyisocyanate can be advantageously used for obtaining a thermocuring resin composition capable of forming a coating having excellent weatherability and heat resistance.

Generally, for producing an isocyanurate polyisocyanate, an isocyanurate-forming reaction is conducted in the following manner using the materials mentioned below. The isocyanurate-forming reaction is generally conducted in the presence of a catalyst. It is preferred that the catalyst for use in isocyanurate-forming reaction be a basic compound. Examples of such basic compounds include a hydroxide of a $C_4$–$C_{32}$, preferably $C_4$–$C_{24}$ tetraalkylammonium, such as tetramethylammonium, tetraethylammonium or tetrabutylammonium, a $C_2$–$C_{30}$, preferably $C_2$–$C_{20}$ carboxylate, such as an acetate, an octylate, a myristylate or a benzoate of the above-mentioned tetra alkylammonium; a hydroxide of a hydroxy($C_4$–$C_{32}$, preferably $C_4$–$C_{24}$ alkyl) ammonium, such as trimethylhydroxyethylammonium, trimethylhydroxypropylammonium, triethylhydroxyethylammonium or triethylhydroxypropylammonium; a $C_2$–$C_{30}$, preferably $C_2$–$C_{20}$ carboxylate, such as an acetate, an octylate, a caproate, a myristylate or a benzoate of the above-mentioned hydroxy($C_4$–$C_{32}$ alkyl)ammonium; an alkali metal salt of a $C_2$–$C_{30}$, preferably $C_2$–$C_{20}$ alkylcarboxylic acid, such as acetic acid, n-caproic acid, octylic acid or myristic acid; a salt of the above-mentioned alkylcarboxylic acid with tin, zinc or lead; and a compound containing an aminosilyl group, such as hexamethylenedisilazane. The catalyst is generally used in an amount of from 10 weight ppm to 1.0 wt %, based on the weight of the diisocyanate used for the reaction. In the isocyanurate-forming reaction, a solvent may or 20 may not be used. When a solvent is used, the solvent must be inactive to an isocyanate group. The reaction is generally conducted at 20° to 160° C., preferably 40° to 130° C.

When the yield of the desired product reaches a predetermined level, the reaction may be stopped by adding sulfonic acid, phosphoric acid, a phosphoric ester or the like to the reaction system. The reaction is generally conducted until a yield of 15 to 65%, preferably 20 to 55% is achieved. The reaction time is generally from 1 to 10 hours, preferably 2 to 6 hours. After the reaction is stopped, the unreacted diisocyanate and solvent are removed to thereby obtain a desired polyisocyanate.

In the present invention, an especially preferred isocyanurate polyisocyanate is a urethane-modified isocyanurate polyisocyanate obtained by conducting a urethane modification before and/or during the isocyanurate-forming reaction, using a hydroxyl compound. With respect to the details of the method for obtaining a urethane-modified isocyanurate polyisocyanate, reference can be made, for example, to Unexamined Japanese Patent Application Laid-Open Specification No. 57-47321, Unexamined Japanese Patent Application Laid-Open Specification No. 61-111371 (corresponding to EP-15 55 59 and U.S. Pat. No. 4,582,888) and Unexamined Japanese Patent Application Laid-Open Specification No. 6-312969 (corresponding to WO-9418254 and EP-646608)]. The use of such a urethane-modified isocyanurate polyisocyanate is advantageous not only in that it becomes easy to achieve the average number of the functional isocyanate groups within the range of 4.5 to 10, which is the most preferred range in the present invention, but also in that unfavorable occurrence of crystallization of the blocked polyisocyanate can be suppressed.

Examples of hydroxyl compounds which can be used for the urethane modification include a $C_1$–$C_{20}$, preferably $C_1$–C15 monohydroxyl compound, such as methanol, ethanol, isopropanol and phenol; a $C_2$–$C_{20}$, preferably $C_2$–$C_{15}$ dihydroxyl compound, such as ethylene glycol, propylene glycol, 1,3-butanediol, pentanediol, hexanediol, cyclohexanediol, dimethylol cyclohexane, neopentyl glycol and 2,2,4-trimethyl-1,3-pentanediol; a $C_3$–$C_{20}$, preferably $C_3$–$C_{15}$ polyhydroxyl compound, such as trimethylol propane, glycerin and pentaerythritol; and a polyol, such as an acrylic polyol, a polyester polyol, a polyether polyol, an aliphatic hydrocarbon polyol, an epoxy resin polyol and a fluorinated polyol. Specific examples of polyester polyols include a polyester polyol obtainable by condensation polymerization of at least one dibasic acid (e.g. carboxylic acids, such as succinic acid, adipic acid, sebacic acid, dimeric acid, maleic anhydride, phthalic anhydride, isophthalic acid, and terephthalic acid) with at least one polyhydric alcohol (such as ethylene glycol, propylene glycol, diethylene glycol, neopentyl glycol, 1,4-butanediol, 1,6-hexanediol, trimethylolpropane and glycerin; and a polycaprolactone obtainable by, for example, a ring-opening polymerization of ε-caprolactone with a polyhydric alcohol. Specific examples of aliphatic hydrocarbon polyols include a polybutadiene having terminal hydroxyl groups and a hydrogenation product thereof. Specific examples of polyether polyols include a polyether polyol obtained by reacting at least one alkylene oxide (such as ethylene oxide or propylene oxide) with at least one polyhydric alcohol (such as glycerin or propylene glycol) or with at least one polyfunctional compound (such as ethylenediamine or ethanolamine); a polytetramethylene glycol; and a polymer polyol obtained by polymerizing an acrylamide and the like in the presence of the above-mentioned polyether polyol. Specific examples of epoxy resin polyols include a compound of a novolak type, an ε-methylepichlorohydrin type, a cyclic oxirane type, a glycidyl ether type, a glycol ether type, an epoxidized aliphatic unsaturated compound type, an epoxidized fatty acid ester type, a polycarboxylic ester type, an aminoglycidyl type, an epoxidized halogenated compound type and a resorcin type.

Among these hydroxyl compounds, trimethylolpropane, a polyester polyol and a polyether polyol are preferred.

These hydroxyl compounds can be used individually or in combination.

When the above-mentioned urethane modification is conducted, the resultant reaction mixture comprises various polyisocyanates, individually having at least one structure selected from a urethane structure, an allophanate structure and an isocyanurate structure.

For obtaining an urethane-modified isocyanurate polyisocyanate which can be advantageously used in the present invention, it is preferred that the modification reaction with a hydroxyl compound be conducted so that the urethane modification reaction mixture has a value of from 0.05 to 2.0, preferably from 0.1 to 1.7, more preferably from 0.2 to 1.5, with respect to the ratio of the number of the carbon atoms ascribed to the carbonyl groups in the urethane structure and/or allophanate structure to the number of the carbon atoms ascribed to the carbonyl groups in the isocyanurate structure. The above-mentioned ratio can be obtained by determining the respective amounts of the above-mentioned two types of carbon atoms by, for example, nuclear magnetic resonance spectrometry or infrared spectrophotometry. Alternatively, when the charged amount of each material and the concentration of isocyanate groups in the reaction system are given, the above-mentioned ratio can also be obtained by calculation in accordance with the following formula:

$$\frac{\text{The number of the carbon atoms}}{\text{ascribed to the carbonyl groups}} = \frac{A}{S-E-A} =$$
$$\text{The number of the carbon atoms} \atop \text{ascribed to the carbonyl groups in the isocyanurate structure}$$

$$\frac{r \times \text{OH} \times 2/56100}{\dfrac{D}{4200} - \dfrac{(l+r) \times R}{4200 \times (1-b)} - \dfrac{r \times \text{OH} \times 2}{56100}}$$

A: the number of a urethane structure and/or an allophanate structure present in the urethane modification reaction mixture
S: the number of isocyanate groups in the diisocyanate used as a starting material
E: the number of isocyanate groups in the urethane modification reaction mixture
r: = the weight ratio of a hydroxyl compound (modifying agent) to the diisocyanate used as a starting material
OH: the hydroxyl value of the modifying agent (mg-KOH/g)
D: the concentration (wt %) of the isocyanate group in the diisocyanate used as a starting material
R: the concentration (wt %) of the isocyanate group in the urethane modification reaction mixture
b: the weight ratio of the solvent to the total of the materials used in the urethane modification reaction The modification reaction with a hydroxyl compound is generally conducted at −20° to 150° C., preferably at 0° to 100 ° C.

In the present invention, as a blocking agent, at least one active methylene compound selected from a malonic diester and an acetoacetic ester is used.

With respect to the composition of the blocking agent, it is preferred that the blocking agent comprises 20 to 100 equivalent % (more preferably 30 to 90 equivalent %, most preferably 40 to 80 equivalent %) of a malonic diester and 80 to 0 equivalent % (more preferably 70 to 10 equivalent %, most preferably 60 to 20 equivalent %) of an acetoacetic ester. When a blocking agent having more than 80 equivalent % of an acetoacetic ester is used for obtaining a blocked polyisocyanate, disadvantages are likely to be caused such that a thermocuring resin composition containing such a blocked polyisocyanate has a poor curability at a low temperature, so that a coating formed from such a thermocuring resin composition must be heated at a high temperature to cause a sufficient crosslinking between the polyisocyanate and the polyol.

In the present invention, it is preferred that the malonic diester have 5 to 23 carbon atoms, more preferably 5 to 15 carbon atoms. Specific examples of malonic diesters include dimethyl malonate, diethyl malonate, diisopropyl malonate, di(n-propyl) malonate, di(n-butyl) malonate, ethyl(n-butyl) malonate, methyl(n-butyl) malonate, ethyl(t-butyl) malonate, methyl(t-butyl) malonate, diethyl methylmalonate, dibenzyl malonate, diphenyl malonate, benzylmethyl malonate, ethylphenyl malonate, (t-butyl) phenyl malonate and isopropylidene malonate. These malonic diesters may be used individually or in combination.

In the present invention, it is preferred that the acetoacetic ester have 5 to 20 carbon atoms, more preferably 5 to 12 carbon atoms. Examples of acetoacetic esters include methyl acetoacetate, ethyl acetoacetate, isopropyl acetoacetate, n-propyl acetoacetate, t-butyl acetoacetate, n-butyl acetoacetate, benzyl acetoacetate and phenyl acetoacetate. These acetoacetic esters may be used individually or in combination.

In the present invention, it is preferred that the active methylene compound be used in an amount such that the equivalent ratio of the active methylene compound to the isocyanate group in the polyisocyanate be from 0.9:1 to 1.5:1, more preferably from 1:1 to 1.2:1.

In the present invention, a part of the terminal isocyanate groups of the polyisocyanate may be reacted with a compound containing an active hydrogen, such as an alcohol, a phenol, an acid amide, an imidazole, a pyridine, a mercaptan, an oxim or an amine, instead of an active methylene compound. The compounds containing an active hydrogen may be preferably used in an amount of 30 equivalent % or less, relative to the amount of the terminal isocyanate groups in the polyisocyanate.

The reaction of the polyisocyanate with the blocking agent comprising at least one active methylene compound is conducted in the presence of a basic compound. The basic compound has a function to promote the reaction between the polyisocyanate and the blocking agent, that is, a catalytic function. Examples of basic compounds include $C_1$–$C_{20}$, preferably $C_1$–$C_{12}$ metallic alcoholates, such as sodium methylate, sodium ethylate, sodium phenolate and potassium methylate; hydroxides of $C_4$–$C_{32}$, preferably $C_4$–$C_{24}$ tetraalkylammoniums, such as tetramethylammonium, tetraethylammonium and tetrabutylammonium; and $C_2$–$C_{30}$, preferably $C_2$–$C_{20}$ carboxylates, such as acetates, octylates, myristilates and benzoates, of the above-mentioned tetraalkylammonium hydroxides; alkali metal salts of $C_2$–$C_{30}$, preferably $C_2$–$C_{20}$ alkylcarboxylic acids, such as acetic acid, caproic acid, octylic acid and myristic acid; metal salts, such as tin salts, lead salts and zinc salts, of the above-mentioned alkylcarboxylic acids; aminosilyl group-containing compounds, such as hexamethylenedisilazane; and hydroxides of alkali metals, such as lithium, sodium and potassium.

The basic compound is used in an amount of 0.01 to 5% by weight, preferably 0.05 to 3% by weight, more preferably 0.1 to 2% by weight, based on the weight of the polyisocyanate.

The reaction between the polyisocyanate and the blocking agent comprising at least one active methylene compound can be conducted without solvents or in the solvents.

The reaction is generally conducted at a temperature of from −20° to 150 ° C., preferably from 0° to 100° C. With respect to the reaction time, the reaction is carried out until the terminal isocyanate group content of the polyisocyanate becomes 10 mole % or less, preferably 5 mole % or less, based on the terminal isocyanate group content prior to the reaction. For example, the reaction is conducted for a period of time of preferably from 0.5 to 10 hours, more preferably from 1 to 6 hours.

After completion of the reaction between the polyisocyanate and the blocking agent, the resultant reaction mixture containing the basic compound is then reacted with an acidic compound as described below to neutralize at least a part of the basic compound and cause the resultant blocked polyisocyanate composition to have a pH value of from 1 to 8.5. That is, a salt of a basic compound with an acidic compound, or a mixture of the salt with the basic compound or the acidic compound, is formed in the blocked polyisocyanate composition.

When the basic compound contained in the blocked polyisocyanate composition obtained by the above reaction is not neutralized with an acidic compound and remains as it is, it adversely affects the stability of the composition, so that the composition deteriorates with the lapse of time. Illustratively stated, when the blocked polyisocyanate composition, in which a basic compound is not neutralized with an acidic compound and remains as it is, is stored for a prolonged period of time or under high temperature conditions, a one-pack thermocuring resin composition containing the blocked polyisocyanate composition inevitably has low curability. However, as mentioned above, by neutralizing the basic compound contained in the blocked polyisocyanate composition, it is possible to suppress lowering of the curability of the thermocuring resin composition containing the blocked polyisocyanate composition, which lowering conventionally, frequently occurs during the storage of the blocked polyisocyanate composition.

Examples of acidic compounds used for neutralizing the basic compound include hydrochloric acid, phosphorous acid and phosphoric acid; sulfonic acids and derivatives thereof, such as methanesulfonic acid, p-toluenesulfonic acid, methyl p-toluenesulfonate and ethyl p-toluenesulfonate; and $C_1$–$C_{50}$, preferably $C_1$–$C_{30}$ acidic esters of phosphoric acid and phosphorous acid, such as ethyl phosphate, diethyl phosphate, isopropyl phosphate, diisopropyl phosphate, butyl phosphate, dibutyl phosphate, 2-ethylhexyl phosphate, di(2-ethylhexyl) phosphate, isodecyl phosphate, diisodecyl phosphate, oleyl acid phosphate, tetracosyl acid phosphate, ethylene glycol acid phosphate, butyl pyrophosphate and dibutyl phosphite. The above-mentioned acidic compounds may be used individually or in combination.

The acidic compound is used in an amount of from 0.3 to 3 equivalents, preferably from 0.5 to 2 equivalents, more preferably from 0.7 to 1.5 equivalents, relative to one equivalent of the basic compound used.

As mentioned above, the blocked polyisocyanate composition thus obtained after the neutralization of at least a part of the basic compound with the acidic compound has a pH value of from 1 to 8.5, preferably from 1.5 to 7.5, more preferably from 2 to 6.5. When the pH value of the blocked polyisocyanate composition exceeds 8.5, the blocked polyisocyanate composition needs to be stored at a low temperature, for suppressing the deterioration with the lapse of time as much as possible. On the other hand, when the pH value of the blocked polyisocyanate composition is less than 1, a substrate coated with a coating composition containing the blocked polyisocyanate composition suffers from corrosion.

In the present invention, the pH value of the blocked polyisocyanate composition is determined by diluting the polyisocyanate composition with methanol so that the concentration of the polyisocyanate composition in the resultant mixture becomes 30% by weight, followed by measuring a pH value at 20° C. by means of a pH meter.

In the present invention, for obtaining a one-pack thermocuring resin composition having excellent storage stability, it is preferred that the blocked polyisocyanate further comprises at least one compound selected from monofunctional and bifunctional compounds each containing active hydrogen.

As already mentioned above, U.S. Pat. Nos. 4,439,593, 4,518,522 and 4,677,180 disclose a technique to improve the storage stability of a one-pack coating composition containing the active methylene-blocked polyisocyanate by addition of a monofunctional compound to the blocked polyisocyanate or the coating composition containing the blocked polyisocyanate. However, in the technique of these patent documents, when the monofunctional compound is added to the blocked polyisocyanate used in these patent documents prior to the preparation of the one-pack coating composition, the stability of the blocked polyisocyanate is disadvantageously lowered. Therefore, especially when the mixture of the blocked polyisocyanate disclosed and used in the above patent documents and the monofunctional compound is stored for a prolonged period of time or stored under high temperature conditions and then used for producing a one-pack coating composition, the obtained coating composition is caused to have disadvantageously poor curability.

Therefore, when a mixture of the blocked polyisocyanate (disclosed in the above patent documents) and the monofunctional compound is used for producing a coating composition, the mixture must be used immediately after the preparation of the mixture, or must be stored under low temperature conditions.

On the other hand, it has unexpectedly been found that when the above-mentioned monofunctional compound and/or bifunctional compound is added to the blocked polyisocyanate composition of the present invention (which comprises an active methylene-blocked polyisocyanate, and a salt of a basic compound with an acidic compound, or a mixture of the salt with the basic compound or the acidic compound, wherein the blocked polyisocyanate composition has a pH value of from 1 to 8.5), the resultant blocked polyisocyanate composition containing the monofunctional compound and/or bifunctional compound can be advantageously used for producing a thermocuring resin composition which has not only excellent storage stability but also excellent curability. The reason for this is as follows. Contrary to the above-mentioned unstable mixture of the blocked polyisocyanate (disclosed and used in the above patent documents) with the monofunctional compound, which mixture causes the lowering of the curability of the coating composition containing the mixture, the blocked polyisocyanate composition of the present invention does not suffer a disadvantageous lowering in stability by the addition of the monofunctional and/or bifunctional compound. Therefore, even after the blocked polyisocyanate composition of the present invention, containing the monofunctional compound and/or bifunctional compound, is stored for a prolonged period of time or stored under high temperature conditions, the blocked polyisocyanate composition can be advantageously used for producing a one-pack thermocuring resin composition having not only excellent storage stability but also excellent curability.

When the one-pack thermocuring resin composition, which comprises the blocked polyisocyanate composition of the present invention containing the monofunctional compound and/or bifunctional compound, is coated onto a substrate, and a coating is formed by thermocuring, at least a portion of the monofunctional and bifunctional compounds evaporates from the coating. Examples of monofunctional compound and/or bifunctional compound include alcohols, phenols, acid amides, imidazoles, pyridines, mercaptanes, oximes and amines. Of these compounds, alcohols, phenols and oximes, particularly alcohols, are preferred.

It is preferred that the boiling points of the monofunctional and bifunctional compounds are not higher than 250° C., preferably in the range of from 50° to 220° C., more preferably in the range of from 60° to 200° C. Examples of alcohols phenols and oximes having such boiling points as mentioned above include monovalent alcohols, such as methanol, ethanol, 1-propanol, 2-propanol, 1-butanol, 2-butanol, t-butanol, pentanol, hexanol, heptanol, octanol, 2-ethyl-1-hexanol, n-butyl cellosolve, propylene glycol monomethyl ether, cyclohexanol and benzyl alcohol; divalent alcohols, such as ethylene glycol, diethylene glycol, propylene glycol, 1,3propanediol and butanediol; phenols, such as phenol, cresol, xylenol, carvacrol, thymol and catechol; and oximes, such as acetoxime, methyl ethyl ketoxime and cyclohexanoxime.

The amount of the monofunctional compound and/or bifunctional compound can be appropriately selected; however, the blocked polyisocyanate composition may generally contain the monofunctional and/or bifunctional compound in an amount of from 10 to 500 equivalent %, preferably from 20 to 400 equivalent %, more preferably from 30 to 300 equivalent %, relative to the amount of the terminal blocked isocyanate groups.

The timing for adding the monofunctional compound and/or bifunctional compound to the blocked polyisocyanate composition of the present invention is not specifically limited. However, the monofunctional compound and/or bifunctional compound is generally added to the blocked polyisocyanate composition when the reaction between the polyisocyanate and the blocking agent comprising at least one active methylene compound has advanced to a degree of 70% or more, preferably 80% or more, more preferably 90% or more. The monofunctional compound and/or bifunctional compound can be added to the blocked polyisocyanate composition before or after neutralizing at least a part of the basic compound with the acidic compound. It is preferred that the addition be conducted before the neutralization of at least a part of the basic compound with the acidic compound.

As mentioned above, in another aspect of the present invention, there is provided one-pack thermocuring resin composition comprising the blocked polyisocyanate composition of the present invention and a polyol.

Examples of polyols used as a main component of the one-pack thermocuring resin composition include aliphatic hydrocarbon polyols, polyether polyols, polyester polyols, epoxy resin polyols, fluorinated polyols and acrylic polyols. Specific examples of aliphatic hydrocarbon polyols include a polybutadiene having terminal hydroxyl groups and a hydrogenation product thereof. Specific examples of polyether polyols include a polyether polyol obtained by reacting at least one alkylene oxide (such as ethylene oxide or propylene oxide) with at least one polyhydric alcohol (such as glycerin or propylene glycol) or with at least one polyfunctional compound (such as ethylenediamine or ethanolamine); a polytetramethylene glycol; and a polymer polyol obtained by polymerizing an acrylamide or the like in the presence of the above-mentioned polyether polyol. Specific examples of polyester polyols include a polyester polyol obtained by condensation polymerization of at least one dibasic acid (e.g. carboxylic acids, such as succinic acid, adipic acid, sebacic acid, dimeric acid, maleic anhydride, phthalic anhydride, isophthalic acid, and terephthalic acid) with at least one polyhydric alcohol (such as ethylene glycol, propylene glycol, diethylene glycol, neopentyl glycol, 1,4-butanediol, 1,6-hexanediol, trimethylolpropane and glycerin); and a polycaprolactone obtainable by a ring-opening polymerization of ε-caprolactone with a polyhydric alcohol. Specific examples of epoxy resin polyols include compounds of a novolak type, a β-methylepichlorohidrin type, a cyclic oxirane type, a glycidyl ether type, a glycol ether type, an epoxidized aliphatic unsaturated compound type, an epoxidized fatty acid ester type, a polycarboxylic acid ester type, an aminoglycidyl type, an epoxidized halogenated type and a resorcin type; and compounds obtained by modification of the above-mentioned epoxy resins with an amino compound, a polyamide compound and the like. Specific examples of fluorinated polyols include copolymers of fluoroolefin monomers with at least one comonomer, such as a cyclohexylvinyl ether, a hydroxyalkylvinyl ether and vinyl esters of monocarboxylic acids [such copolymers are disclosed, for example, in Unexamined Japanese Patent Application Laid-Open Specification No. 57-34107 (corresponding to U.S. Pat. No. 4,345,057, GB Publication No. 2081,727, FR Publication No. 2488260 and DE Publication No. 3,131,441) and Unexamined Japanese Patent Application Laid-Open Specification No. 61-275311 (corresponding to U.S. Pat. Nos. 4,640,966 and 4,690,968, EP Publication No. 180962 and DE Publication No. 3,581,698)].

Specific examples of acrylic polyols include compounds obtainable by copolymerizing at least one acrylic monomer, having in a molecule thereof, at least one active hydrogen with at least one comonomer other than the acrylic monomer, which is copolymerizable with the acrylic monomer. Specific examples of acrylic monomers, having, in a molecule thereof, at least one active hydrogen include acrylic esters having at least one active hydrogen, such as 2-hydroxyethyl acrylate, 2-hydroxypropyl acrylate and 2-hydroxybutyl acrylate; methacrylic esters having at least one active hydrogen, such as 2-hydroxydiethyl methacrylate, 2-hydroxypropyl methacrylate and 2-hydroxybutyl methacrylate; (meth)acrylic esters having at least two or more active hydrogens, such as an acrylic monoester or a methacrylic monoester of glycerin and an acrylic monoester or a methacylic monoester of trimethylolpropane; and a monomer obtainable by ring-opening polymerization of ε-caprolactone with the above-mentioned (meth)acrylic esters having at least one active hydrogen. Examples of the other comonomers copolymerizable with the above-mentioned monomers include acrylic acid esters, such as methyl acrylate, ethyl acrylate, isopropyl acrylate, n-butyl acrylate and 2-ethylhexyl acrylate; methacrylic acid esters, such as methyl methacrylate, ethyl methacrylate, isopropyl methacrylate, n-butyl methacrylate, isobutyl methacrylate, n-hexyl methacrylate, cyclohexyl methacrylate, lauryl methacrylate and glycidyl methacrylate; and one or more of other polymerizable comonomers, for example, unsaturated carboxylic acids (such as acrylic acid, methacrylic acid, maleic acid and itaconic acid), unsaturated amides (such as acrylamide, N-methylolacrylamide and diacetoneacrylamide), styrene, vinyltoluene, vinyl acetate, and acrylonitrile. Also usable as other comonomers copolymerizable with the above-mentioned monomers are polymerizable ultraviolet stable monomers, such as 4-(meth) acryloyloxy-2,2,6,6-tetramethylpiperidine, 4-(meth) acryloylamino-2,2,6,6-tetramethylpiperidine, 1-crotonoyl-4-crotonoyloxy-2,2,6,6-tetramethyl-piperidine, 2-hydroxy-4-[3-(meth)acryloxy-2 -hydroxypropoxy]-benzophenone as exemplified in, for example, Unexamined Japanese Patent Application Laid-Open specification No. 1-261409 (corresponding to U.S. Pat. No. 5,239,028, EP Publication No. 0 337 744, DE Publication No. 68921500 and KR Publication No. 9404720) and Unexamined Japanese Patent Publication Laid-Open Specification No. 3-6273.

Of the above polyols, especially preferred are polyester polyols, fluorinated polyols and acrylic polyols.

It is preferred that the polyol used as a main component of the one pack thermocuring resin composition of the present invention have a hydroxyl value of 10 to 300 mg KOH/g with respect to the nonvolatiles thereof.

In the one-pack thermocuring resin composition of the present invention, the equivalent ratio of the blocked isocyanate groups in the blocked polyisocyanate composition to the hydroxyl groups in the polyol is determined depending upon the desired properties of the coating, but is usually in the range of from 0.1 to 2.

Melamine resins may be additionally used in the one-pack thermocuring resin composition of the present invention. Examples of the melamine resins include hexamethoxymethylolmelamine, methylated and butylated melamines, and butylated melamines.

The one-pack thermocuring resin composition of the present invention may contain additives and solvents, which are generally used in this field. Examples of additives include organic pigments, such as a quinacridone pigment, an azo pigment and a phthalocyanine pigment; inorganic pigments, such as titanium oxide, barium sulfate, calcium carbonate and silica; other pigments, such as carbonic pigment, a metallic foil type pigment and a rust preventive pigment; ultraviolet absorbers, such as hindered amines, benzotriazole and benzophenone; antioxidants, such as hindered phenols, phosphorus, sulfur and hydrazide; catalysts for use in urethane-forming reaction, such as tin, zinc and amine; leveling agents; rheology controlling agents; and dispersants for pigments. If desired, appropriate solvents may be used. The solvents can be optionally selected, depending upon the uses and purposes, from, for example, hydrocarbons, such as benzene, toluene, xylene, cyclohexane, mineral spirits, and naphtha; ketones, such as acetone, methyl ethyl ketone, and methyl isobutyl ketone; and esters, such as ethyl acetate, n-butyl acetate and cellosolve acetate. These solvents may be used individually or in combination.

BEST MODE FOR CARRYING OUT THE INVENTION

Hereinbelow, the present invention will be described in more detail with reference to the following Reference Examples, Examples and Comparative Examples, but they should not be construed as limiting the scope of the present invention.

The term "part(s)" used in the Reference Examples, Examples and Comparative Examples means part(s) by weight.

In the following Examples and Comparative Examples, various properties were evaluated by the following methods.

(1) Measurement of the pH value of a blocked polyisocyanate composition

A blocked polyisocyanate composition is dissolved in methanol so that the concentration of the polyisocyanate composition in the resultant solution becomes 30% by weight. The pH value of the solution was measured at 20°C. by means of a digital pH meter (model HM-30V, manufactured and sold by TOA Electronics Ltd., Japan).

(2) Evaluation of the stability of a blocked polyisocyanate composition

Two different samples of one-pack thermocuring resin compositions were individually prepared from a blocked polyisocyanate composition having been stored at 50° C. for one month and a non-stored fresh blocked polyisocyanate composition having not been stored. The prepared two samples of resin compositions were individually subjected to curing for 30 minutes in an oven maintained at 80°C. to thereby obtain a film. The obtained film was immersed in acetone for 24 hours. With respect to each of the resultant films, the residual weight ratio (%) was calculated, and the difference in residual weight ratio between the thermocuring resin composition containing the stored blocked polyisocyanate composition and the thermocuring resin composition containing the non-stored, fresh blocked polyisocyanate composition was taken as an index of the stability of the blocked polyisocyanate composition. The stability was evaluated in accordance with the following criteria.

| Criteria | Difference in residual weight ratio |
|---|---|
| ⊙ | not more than 5% |
| ○ | more than 5% and not more than 10% |
| Δ | more than 10% and not more than 15% |
| X | more than 15% |

(3) Measurement of curability

A one-pack thermocuring resin composition comprising a blocked polyisocyanate composition is subjected to curing for 30 minutes in an oven maintained at 80° C. or 90°C. to thereby obtain a film. The obtained film was immersed in acetone for 24 hours. With respect to the resultant film, the residual weight ratio was calculated. The curability was evaluated in accordance with the following criteria.

| Criteria | Residual weight ratio |
|---|---|
| ⊙ | not less than 90% |
| ○ | not less than 80% and less than 90% |
| Δ | not less than 70% and less than 80% |
| X | less than 70% |

(4) Evaluation of storage stability

A one-pack thermocuring resin composition comprising a blocked polyisocyanate composition, which has a viscosity of 20 seconds/20° C. as measured by means of a Ford cup #4 (JIS K-5400), was stored at 40° C. for one month, and a change in viscosity of the thermocuring resin composition was measured. The change in viscosity of the resin composition was taken as an index of the storage stability. The storage stability was evaluated in accordance with the following criteria.

| Criteria | Change in viscosity |
|---|---|
| ○ | less than 40 seconds |
| X | not less than 40 seconds |

(5) Measurement of the viscosity of a two or more terminal isocyanate groups-containing polyisocyanate The viscosity of a two or more terminal isocyanate groups-containing polyisocyanate is defined as a viscosity (mPa•s) as measured at 25° C.

The viscosity is measured using a digital viscometer (model DVM-B, manufactured and sold by TOKYO KEIKI Co., Ltd., Japan) at 25° C. and at 60 rpm.

(6) Determination of the content of non-blocked isocyanate groups

The content (% by weight) of non-blocked isocyanate groups in a non-blocked polyisocyanate was determined as follows.

About 2 g of a polyisocyanate was measured for use as a sample. 20 ml of toluene and 20 ml of a 2N solution of n-dibutylamine in toluene were added to the polyisocyanate. The resultant mixture was allowed to stand at room temperature for 15 minutes, and the mixture was subjected to back titration using 1N hydrochloric acid. The content of non-blocked isocyanate groups was determined in accordance with the formula below. As an indicator, Bromocresol Green was used.

The content (% by weight) of non-blocked isocyanate groups= {(titer of blank titration)−(titer of sample titration)}×42/{weight (g) of sample×1000}×100

The titer of blank titration means a titer obtained by conducting titration in substantially the same manner as mentioned above, except that the polyisocyanate was not used.

(7) Determination of the amount of blocked isocyanate groups

The amount (% by weight) of blocked isocyanate groups is defined as the amount of isocyanate groups per se of the blocked isocyanate groups (hereinafter referred to simply as "amount of blocked isocyanate groups"), based on a blocked polyisocyanate composition, which was determined by calculation of the following formula:

$$\frac{\left[\begin{array}{c}\text{isocyanate group}\\ \text{content(\% by weight)}\\ \text{of polyisocyanate}\end{array}\right] \times \begin{array}{c}\text{weight of}\\ \text{polyisocyanate}\end{array}}{\begin{array}{c}\text{weight of blocked polyisocyanate composition}\\ \text{(final reaction mixture neutralized with acidic}\\ \text{compound to have a pH value of from 1 to 8.5)}\end{array}}.$$

(8) Determination of the nonvolatiles content

The nonvolatiles content is determined as follows: about 1.5 g of a sample of a blocked polyisocyanate composition is accurately weighed, and the sample is heated at 105°C. for 1 hour, whereupon the weight of the heated sample is measured. The nonvolatiles content is determined from the difference between the weight of the original sample and the weight of the heated sample.

(9) Measurement of the hydroxyl value of a polyol

The hydroxyl value of a polyol is defined as the amount (mg) of KOH which is required for neutralizing acetic acid necessary for acetylation of free OH groups contained in 1 g of the polyol.

Measurement of the hydroxyl value of a polyol is conducted according to JIS-K0070.

(10) Measurement of the acid value of a polyol

The acid value of a polyol is defined as the amount (mg) of KOH which is required for neutralizing free fatty acids contained in 1 g of the polyol.

Measurement of the acid value of a polyol is conducted according to JIS-K0070.

REFERENCE EXAMPLE 1

(Preparation of polyisocyanate)

A four neck flask, which is equipped with a stirrer, a thermometer, a reflux condenser and a nitrogen introduction pipe, was purged with nitrogen gas, and then charged at room temperature with 100 parts by weight of HDI (hexamethylene diisocyanate) and 3.3 parts by weight of trimethylol propane. The internal temperature of the flask was elevated to 80°C., and the mixture was stirred at 80 ° C. for 2 hours, to thereby effect a urethane-forming reaction. While maintaining the internal temperature of the flask at 80° C., 0.03 part by weight of a 50% by weight solution of tetrabutylammonium acetate in n-butanol was added to the mixture so gradually that the temperature rise of the reaction system is not higher than 5° C., to thereby effect an isocyanurate-forming reaction. When the amount of isocyanate groups in the resultant reaction mixture reached 36% by weight, based on the weight of the reaction mixture, 0.02 part by weight of an aqueous 85% solution of phosphoric acid was added to the reaction mixture to thereby terminate the reaction. The resultant reaction mixture was subjected to filtration to thereby obtain a filtrate. Unreacted HDI was removed from the filtrate using a wiped film evaporator to thereby obtain a urethane-modified isocyanurate polyisocyanate (hereinafter referred to as "polyisocyanate-I").

With respect to the obtained polyisocyanate-I, the viscosity was 25,000 mpa•s (25° C.), the amount of isocyanate groups was 19.5 % by weight, based on the weight of polyisocyanate-I and the average number of functional isocyanate groups was 5.1 per molecule of polyisocyanate-I.

REFERENCE EXAMPLE 2

(Preparation of polyisocyanate)

A four neck flask, which is equipped with a stirrer, a thermometer, a reflux condenser and a nitrogen introduction pipe, was purged with nitrogen gas, and then charged at 20° C. with 100 parts of HDI. While maintaining the internal temperature rise of the flask at 60° C., 0.04 part by weight of a 50% by weight solution of tetrabutylammonium acetate in n-butanol was added to the HDI so gradually that the temperature rise of the reaction system is not higher than 5°C., to thereby effect an isocyanurate-forming reaction. When the amount of isocyanate groups in the resultant reaction mixture reached 44% by weight, 0.03 part by weight of an aqueous 85% solution of phosphoric acid was added to the reaction mixture to thereby terminate the reaction. The resultant reaction mixture was subjected to filtration to thereby obtain a filtrate. Unreacted HDI was removed from the filtrate using a wiped film evaporator to thereby obtain an isocyanurate polyisocyanate-II. The obtained isocyanurate polyisocyanate (hereinafter referred to as "polyisocyanate-II") exhibited a viscosity of 1,700 mPa•s (25° C.) and had an isocyanate group content of 23.0% by weight. The average number of functional isocyanate groups of the obtained polyisocyanate-II was 3.2 per molecule of polyisocyanate-II.

EXAMPLE 1

A four neck flask, which is equipped with a stirrer, a thermometer, a reflux condenser and a nitrogen introduction pipe, was purged with nitrogen gas, and then charged at room temperature with 100 parts by weight of polyisocyanate-I (obtained in Reference Example 1), 52 parts by weight of diethyl malonate, 21 parts by weight of ethyl acetoacetate, 39 parts by weight of xylene and 0.7 part by weight of a 28% by weight solution of sodium methylate in methanol. The resultant mixture was subjected to reaction at 60°C. for 6 hours.

To the resultant reaction mixture was added 71 parts by weight of n-butanol, followed by stirring at 60° C. for 1 hour. The resultant mixture had a pH value of 9.5.

To the above-obtained mixture was added 0.8 part by weight of dibutyl phosphate to obtain a final reaction mixture.

The ratio of reaction of the isocyanate groups of polyisocyanate-I was 99%, as calculated from a difference in isocyanate concentration between before and after the reaction.

The nonvolatiles content of the above-obtained final reaction mixture was 60% by weight.

The desired blocked polyisocyanate composition was obtained as the above-mentioned final reaction mixture. The amount of blocked isocyanate groups was 6.9% by weight, based on the final reaction mixture. The blocked polyisocyanate composition had a pH value of 5.4.

EXAMPLE 2

A four neck flask, which is equipped with a stirrer, a thermometer, a reflux condenser and a nitrogen introduction pipe, was purged with nitrogen gas, and then charged at room temperature with 100 parts by weight of polyisocyanate-I (obtained in Reference Example 1), 62 parts by weight of diethyl malonate, 13 parts by weight of ethyl acetoacetate, 39 parts by weight of xylene and 0.7 part by weight of a 28% by weight solution of sodium methylate in methanol. The resultant mixture was subjected to reaction at 80° C. for 4 hours. The resultant mixture had a pH value of 9.5.

To the resultant mixture was added 0.7 part by weight of 2-ethylhexyl acid phosphate (JP-508, manufactured and sold by JOHOKU Chemical Co., Ltd., Japan, acid value : 298 mgKOH/g) and 71 parts by weight of n-butanol, followed by stirring at 80° C. for 10 minutes to obtain a final reaction mixture.

The ratio of reaction of the isocyanate groups of polyisocyanate-I was 96%.

The nonvolatiles content of the above-obtained final reaction mixture was 60% by weight.

The desired blocked polyisocyanate composition was obtained as the above-mentioned final reaction mixture. The amount of blocked isocyanate groups was 6.8% by weight, based on the final reaction mixture. The blocked polyisocyanate composition had a pH value of 5.3.

EXAMPLES 3 to 10

In Examples 3 to 10, various blocked polyisocyanate compositions were obtained in substantially the same manner as in Example 1, except that the types and amounts of components were changed as indicated in Table 1 and Table 2. The properties of the obtained blocked polyisocyanate compositions were measured by the methods as mentioned above. The results are shown in Table 1 and Table 2.

Comparative Example 1

A blocked polyisocyanate composition was obtained in substantially the same manner as in Example 1, except that the dibutyl phosphate was not used. The blocked polyisocyanate composition obtained had a pH value of 9.5. The properties of the blocked polyisocyanate composition obtained were measured by the methods as mentioned above. The results are shown in Table 2.

Comparative Example 2

A blocked polyisocyanate composition was obtained in substantially the same manner as in Example 1, except that the types and amounts of components were changed as indicated in Table 2. The properties of the obtained blocked polyisocyanate composition were measured by the methods as mentioned above. The results are shown in Table 2.

Comparative Example 3

A four neck flask, which is equipped with a stirrer, a thermometer, a reflux condenser and a nitrogen introduction pipe, was purged with nitrogen gas, and then charged at room temperature with 100 parts by weight of HDI-derived isocyanurate polyisocyanate [manufactured and sold by Rhône-Poulenc Chimie, France under the trade name of Tolonat HDT/100 (nonvolatiles content: 100% by weight, isocyanate group content: 21% by weight)] and 100 parts by weight of Solvesso 100 (aromatic solvent manufactured and sold by Exxon Co., Ltd., U.S.A.). The resultant mixture was heated to 80° C. Subsequently, 1.2 parts by weight of lithium hydroxide anhydride were added to the heated mixture. To the resultant mixture were added 84 parts by weight of diethyl malonate so gradually that the temperature of the reaction system does not exceed 90° C. A reaction was conducted at 90 ° C until the amount of isocyanate groups in the resultant reaction mixture reached 0.5% by weight, based on the weight of the reaction mixture. The resultant final reaction mixture had a pH value of 9.9.

The final reaction mixture was subjected to filtration using a 1 μm-pore size filter, to thereby separate unreacted lithium hydroxide from the final reaction mixture to obtain a filtrate.

The nonvalatiles content of the filtrate was 63% by weight.

The amount of blocked isocyanate groups was 7.4% by weight, based on the weight of the filtrate. The blocked polyisocyanate composition as the filtrate had a pH value of 9.8.

EXAMPLE 11

100 parts by weight of the blocked polyisocyanate composition obtained in Example 1 was mixed with 184 parts by weight of Acrydic A-801 (trade name of an acrylic polyol manufactured and sold by Dainippon Ink & Chemicals Incorporated, Japan; hydroxyl value of nonvolatiles: 100 mgKOH/g, nonvolatiles content : 50% by weight). To the resultant mixture was added a mixed solution of ethyl acetate/toluene/butyl acetate/xylene/propylene glycol monomethyl ether acetate (weight ratio : 30/30/20/15/5) as a thinner so that the resultant exhibits a viscosity of 20 seconds/20° C. as measured using Ford cup #4 (JIS K-5400), to obtain a one-pack thermocuring resin composition. A portion of the one-pack thermocuring resin composition obtained was coated on a polypropylene plate using an air spray gun so that the resultant coating had a thickness of 50 μm when dried. Using this coating, the curability of the above-obtained one-pack thermocuring resin composition was evaluated in accordance with the method as mentioned above. With respect to another portion of the one-pack thermocuring resin composition, the storage stability was evaluated in accordance with the method as mentioned above.

On the other hand, the blocked polyisocyanate composition obtained in Example 1 was stored at 50° C. for 1 month. Using the blocked polyisocyanate composition after the storage, a one-pack thermocuring resin composition was prepared in substantially the same manner as mentioned above. The curability of the thus obtained one-pack thermocuring resin composition was measured in accordance with the method as mentioned above, and was compared with the curability of the above-mentioned one-pack thermocuring resin composition obtained using the non-stored, fresh blocked polyisocyanate composition obtained in Example 1, to evaluate the stability of the blocked polyisocyanate composition obtained in Example 1.

Results of the evaluations made with respect to the blocked polyisocyanate compositions and the one-pack thermocuring resin compositions are shown in Table 3.

EXAMPLES 12 to 20

One-pack thermocuring resin compositions were prepared in substantially the same manner as in Example 11, except that the types and amounts of components were changed as indicated in Table 3 and Table 4. The curability and storage stability of each of the one-pack thermocuring resin compositions obtained in these Examples 12 to 20 and the stability of each of the blocked polyisocyanate compositions used in these Examples 12 to 20 were evaluated by the methods as mentioned above. The results are shown in Table 3 and Table 4.

Comparative Examples 4 to 6

One-pack thermocuring resin compositions were obtained in substantially the same manner as in Example 11, except that the types and amounts of components were changed as indicated in Table 4. The curability and storage stability of each of the one-pack thermocuring resin compositions obtained in these Comparative Examples 4 to 6 and the stability of each of the blocked polyisocyanate compositions used in these Comparative Examples 4 to 6 were evaluated by the methods as mentioned above. The results are shown in Table 4. As apparent from Table 4, with respect to each of the blocked polyisocyanate compositions used in these Comparative Examples 4 and 6, the curability was lowered during the storage. With respect to the one-pack thermocuring resin composition of Comparative Example 5, the curability was unsatisfactory.

TABLE 1

|  | Ex. 1 | Ex. 2 | Ex. 3 | Ex. 4 | Ex. 5 | Ex. 6 |
|---|---|---|---|---|---|---|
| polyisocyanate-I [*1], parts | 100 | 100 | 100 | 100 | 100 | 100 |
| polyisocyanate-II [*2], parts |  |  |  |  |  |  |
| T1890 [*3], parts |  |  |  |  |  |  |
| 24A [*4], parts |  |  |  |  |  |  |
| P301 [*5], parts |  |  |  |  |  |  |
| HDT [*6], parts |  |  |  |  |  |  |
| diethyl malonate, parts | 52 | 62 | 62 | 78 | 52 | 52 |
| ethyl acetoacetate, parts | 21 | 13 | 13 |  | 21 | 21 |
| xylene, parts | 39 | 39 | 39 | 40 | 39 | 39 |
| n-butanol, parts | 71 | 71 | 71 | 73 | 71 | 71 |
| basic compound |  |  |  |  |  |  |
| sodium methylate [*7], part | 0.7 | 0.7 | 0.7 |  | 0.7 | 0.7 |
| sodium phenolate, part |  |  |  | 0.4 |  |  |
| acidic compound |  |  |  |  |  |  |
| DBP [*8], part(s) | 0.8 |  |  | 0.8 | 0.4 | 1.5 |
| JP508 [*9], part |  | 0.7 |  |  |  |  |
| p-TSA [*10], part |  |  | 0.6 |  |  |  |

TABLE 1-continued

|  | Ex. 1 | Ex. 2 | Ex. 3 | Ex. 4 | Ex. 5 | Ex. 6 |
|---|---|---|---|---|---|---|
| nonvolatiles (%) | 60 | 60 | 60 | 60 | 60 | 60 |
| amount of blocked isocyanate groups (%) [*11] | 6.9 | 6.8 | 6.8 | 6.7 | 6.9 | 6.8 |
| neutralization equivalent | 1.0 | 1.0 | 1.0 | 1.0 | 0.5 | 2.0 |
| pH value before neutralization | 9.5 | 9.0 | 9.4 | 9.1 | 9.5 | 9.5 |
| pH value of BPI | 5.4 | 5.3 | 4.5 | 5.2 | 7.4 | 4.2 |

Note:
[*1] polyisocyanate-I: urethane-modified isocyanurate polyisocyanate obtained in Reference Example 1.
[*2] polyisocyanate-II: isocyanurate polyisocyanate obtained in Reference Example 2.
[*3] T1890: VESTANT T 1890/100 (IPDI-derived isocyanurate polyisocyanate manufactured by Hüls Aktiengesellschaft, Germany; nonvolatiles: 100%, isocyanate content: 17.2%)(IPDI: isophorone diisocyanate)
[*4] 24A: Duranate 24A-100 (HDI-derived biuret polyisocyanate manufactured by Asahi Chemical Industry Co., Ltd., Japan; nonvolatiles: 100%, isocyanate content: 23.5%)(HDI: hexamethylene diisocyanate)
[*5] P301: Duranate P301-75E (HDI-derived urethane polyisocyanate manufactured by Asahi Chemical Industry Co., Ltd., Japan; nonvolatiles: 75%, isocyanate content: 13.0%)
[*6] HDT: Tolonat HDT/100 (HDI-derived isocyanurate polyisocyanate manufactured by Rhône-Poulenc Chimie, France; nonvolatiles: 100%, isocyanate content: 21.0%)
[*7] 28% methanol solution of sodium methylate
[*8] DBP: dibutyl phosphate
[*9] JP508: 2-ethylhexyl acid phosphate (manufactured by Johoku Chemical Co., Ltd., Japan; acid value: 298)
[*10] p-TSA: p-Toluene sulfonate
[*11] amount % by weight of blocked isocyanate groups (NC0) per se of the blocked isocyanate groups, based on the final reaction mixture.

TABLE 2

|  | Ex. 7 | Ex. 8 | Ex. 9 | Ex.10 | Comp. Ex. 1 | Comp. Ex. 2 | Comp. Ex. 3 |
|---|---|---|---|---|---|---|---|
| polyisocyanate-I [*1], parts |  | 73 |  |  | 100 | 100 |  |
| polyisocyanate-II [*2], parts | 100 |  |  |  |  |  |  |
| T1890 [*3], parts |  | 27 |  |  |  |  |  |
| 24A [*4], parts |  |  | 100 |  |  |  |  |
| P301 [*5], parts |  |  |  | 100 |  |  |  |
| HDT [*6], parts |  |  |  |  |  |  | 100 |
| diethyl malonate, parts | 61 | 50 | 63 | 35 | 52 |  |  |
| ethyl acetoacetate, parts | 25 | 20 | 25 | 14 | 21 | 63 |  |
| xylene, parts | 41 | 38 | 42 | 3 | 39 | 37 | 100 [*7] |
| n-butanol, parts | 76 | 69 | 77 | 51 | 71 | 67 |  |
| basic compound |  |  |  |  |  |  |  |
| sodium methylate [*8], part | 0.8 | 0.7 | 0.8 | 0.5 | 0.7 | 0.7 |  |
| lithium hydroxide, parts |  |  |  |  |  |  | 1.2 |
| acidic compound |  |  |  |  |  |  |  |
| DBP [*9], part | 0.8 | 0.8 | 0.8 | 0.6 |  | 0.7 |  |
| JP508 [*10] |  |  |  |  |  |  |  |
| p-TSA [*11] |  |  |  |  |  |  |  |
| nonvolatiles (%) | 60 | 60 | 60 | 60 | 60 | 60 | 63 |
| amount of blocked isocyanate groups (%) [*12] | 7.6 | 6.8 | 7.6 | 6.4 | 6.9 | 7.3 | 7.4 |
| neutralization equivalent | 1.0 | 1.0 | 1.0 | 1.0 | 0 | 1.0 | filtration [*13] |
| pH value before neutralization | 9.4 | 9.6 | 9.4 | 9.5 | 9.5 | 9.4 | 9.9 |
| pH value of BPI | 5.2 | 5.4 | 5.3 | 4.9 | 9.5 | 5.4 | 9.8 |

Note:
[*1] polyisocyanate-I: urethane-modified isocyanurate polyisocyanate obtained in Reference Example 1.
[*2] polyisocyanate-II: isocyanurate polyisocyanate obtained in Reference Example 2.
[*3] T1890: VESTANT T 1890/100 (IPDI-derived isocyanurate polyisocyanate manufactured by Hüls Aktiengesellschaft, Germany; nonvolatiles: 100%, isocyanate content: 17.2%)(IPDI: isophorone diisocyanate)
[*4] 24A: Duranate 24A-100 (HDI-derived biuret polyisocyanate manufactured by Asahi Chemical Industry Co., Ltd., Japan; nonvolatiles: 100%, isocyanate content: 23.5%)(HDI: hexamethylene diisocyanate)

TABLE 2-continued

|  | Ex. 7 | Ex. 8 | Ex. 9 | Ex.10 | Comp. Ex. 1 | Comp. Ex. 2 | Comp. Ex. 3 |
| --- | --- | --- | --- | --- | --- | --- | --- |

[*5] P301: Duranate P301-75E (HDI-derived urethane polyisocyanate manufactured by Asahi Chemical Industry Co., Ltd., Japan; nonvolatiles: 75%, isocyanate content: 13.0%)
[*6] HDT: Tolonat HDT/100 (HDI-derived isocyanurate polyisocyanate manufactured by Rhône-Poulenc Chimie, France; nonvolatiles: 100%, isocyanate content: 21.0%)
[*7] Solvesso 100 manufactured by Exxon Co., Ltd., U.S.A. was used instead of xylene.
[*8] 28% methanol solution of sodium methylate
[*9] DBP: dibutyl phosphate
[*10] JP508: 2-ethylhexyl acid phosphate (manufactured by Johoku Chemical Co., Ltd., Japan; acid value: 298)
[*11] p-TSA: p-Toluene sulfonate
[*12] amount % by weight of isocyanate groups (NC0) per se of the blocked isocyanate groups, based on the final reaction mixture.
[*13] not neutralized but filtered using a 1 μm-pore size filter.

TABLE 3

|  | Ex. 11 | Ex. 12 | Ex. 13 | Ex. 14 | Ex. 15 | Ex. 16 |
| --- | --- | --- | --- | --- | --- | --- |
| blocked polyisocyanate composition (parts) | Ex. 1 100 | Ex. 2 100 | Ex. 3 100 | Ex. 4 100 | Ex. 5 100 | Ex. 6 100 |
| A-801 [*1] (parts) | 184 | 182 | 182 | 179 | 184 | 182 |
| curability |  |  |  |  |  |  |
| 80° C. | ○ | ○ | ○ | ○ | ○ | ○ |
| 90° C. | ○ | ◎ | ◎ | ◎ | ◎ | ◎ |
| storage stability of TRC [*2] | ○ | ○ | ○ | ○ | ○ | ○ |
| stability of BPI [*3] | ◎ | ◎ | ◎ | ◎ | ○ | ◎ |

Note:
[*1] A-801: Acrydic A-801 (acrylic polyol manufactured by Dainippon Ink & Chemicals, Inc., Japan)
[*2] TRC: one-pack thermocuring resin composition
[*3] BPI: blocked polyisocyanate

TABLE 4

|  | Ex. 17 | Ex. 18 | Ex. 19 | Ex. 20 | Comp. Ex. 4 | Comp. Ex. 5 | Comp. Ex. 6 |
| --- | --- | --- | --- | --- | --- | --- | --- |
| blocked polyisocyanate composition (parts) | Ex. 7 100 | Ex. 8 100 | Ex. 9 100 | Ex. 10 100 | Comp. Ex. 1 100 | Comp. Ex. 2 100 | Comp. Ex. 3 100 |
| A-801 [*1] (parts) | 203 | 182 | 203 | 171 | 184 | 195 | 198 |
| curability |  |  |  |  |  |  |  |
| 80° C. | Δ | Δ | Δ | Δ | ○ | X | Δ |
| 90° C. | ○ | ○ | ○ | ○ | ○ | X | ○ |
| storage stability of TRC [*2] | ○ | ○ | ○ | ○ | ○ | ○ | X |
| stability of BPI [*3] | ◎ | ◎ | ◎ | ◎ | X | ◎ | X |

Note:
[*1] A-801: Acrydic A-801 (acrylic polyol manufactured by Dainippon Ink & Chemicals, Inc., Japan)
[*2] TRC: one-pack thermocuring resin composition
[*3] BPI: blocked polyisocyanate

INDUSTRIAL APPLICABILITY

The blocked polyisocyanate composition of the present invention not only exhibits high stability even under high temperature conditions, but also is capable of maintaining such high stability for a prolonged period of time. The blocked polyisocyanate composition can be combined with a polyol to provide a one-pack thermocuring resin composition which exhibits not only excellent storage stability but also excellent curability even under low temperature conditions. Such a one-pack thermocuring resin composition can be advantageously used as a topcoating and an intercoating material for an automobile; a chip-resistant coating material; an electrodeposition coating material; a coating material for an automobile part; a coating material for repairing an automobile; a coating material for a precoated metal or a rust-resistant steel plate of a metallic product, such as a domestic electric appliance or a business and office machine; a coating material for a building material; a coating material for a plastic; an adhesive; an adhesiveness-imparting agent; a sealing agent; and the like.

We claim:

1. A blocked polyisocyanate composition comprising:
   a blocked polyisocyanate obtained by blocking the terminal isocyanate groups of a two or more terminal isocyanate groups-containing polyisocyanate derived from at least one diisocyanate selected from the group consisting of an aliphatic diisocyanate and an alicyclic diisocyanate with a blocking agent comprising at least one active methylene compound selected from the group consisting of a malonic diester and an acetoacetic ester; and
   a salt obtained by neutralizing a basic compound with an acidic compound selected from the group consisting of hydrochloric acid, phosphoric acid, phosphorous acid, a sulfonic acid and a derivative thereof, a $C_1$–$C_{50}$ acidic ester of phosphoric acid, and a $C_1$–$C_{50}$ acidic ester of phosphorous acid, or a mixture of said salt with said acidic compound,
   said composition having a pH value of from 2 to 6.5.

2. The composition according to claim 1, wherein said two or more terminal isocyanate groups-containing polyisocyanate is a urethane-modified isocyanurate polyisocyanate.

3. The composition according to claim 1, wherein said two or more terminal isocyanate groups-containing polyisocyanate has an average number of functional isocyanate groups of from 4.5 to 10 per molecule of said polyisocyanate.

4. The composition according to claim 1, wherein said blocking agent comprises a mixture of 30 to 90 equivalent % of a malonic diester and 70 to 10 equivalent % of an acetoacetic ester, wherein each equivalent % value is expressed, based on the total of said malonic diester and said acetoacetic ester.

5. The composition according to claim 1, further comprising at least one monofunctional or bifunctional compound containing active hydrogen, which is selected from the group consisting of methanol, ethanol, 1-propanol, 2-propanol, 1-butanol, 2-butanol, t-butanol, pentanol, hexanol, heptanol, octanol, 2-ethyl-l-hexanol, n-butyl cellosolve, propylene glycol monomethyl ether, cyclohexanol, benzyl alcohol, ethylene glycol, diethylene glycol, propylene glycol, 1,3 propanediol, butanediol, phenol, cresol, xylenol, carvacrol, thymol, catechol, acetoxime, methyl ethyl ketoxime and cyclohexanoxime.

6. A method for producing a blocked polyisocyanate composition, comprising reacting a two or more terminal isocyanate groups-containing polyisocyanate derived from at least one diisocyanate selected from the group consisting of an aliphatic diisocyanate and an alicyclic diisocyanate with a blocking agent comprising at least one active methylene compound selected from the group consisting of a malonic diester and an acetoacetic acid ester in the presence of a basic compound to obtain a reaction mixture containing the basic compound, and reacting said reaction mixture with an acidic compound in an amount sufficient to neutralize the basic compound and cause the resultant blocked polyisocyanate composition to have a pH value of from 2 to 6.5.

7. A one-pack thermocuring resin composition comprising a blocked polyisocyanate composition according to any one of claims 1 to 5 and a polyol selected from the group consisting of a polyester polyol, a fluorinated polyol and an acrylic polyol.

* * * * *